(12) United States Patent
Liao et al.

(10) Patent No.: US 8,651,687 B1
(45) Date of Patent: Feb. 18, 2014

(54) CHARGING DEVICE FOR A LIGHT

(71) Applicants: Su-Chang Liao, Taichung (TW);
Di-Shun Liao, Taichung (TW)

(72) Inventors: Su-Chang Liao, Taichung (TW);
Di-Shun Liao, Taichung (TW)

(73) Assignee: S-Sun Enterprise Co., Ltd., Taichung (TW)

( * ) Notice: Subject to any disclaimer, the term of this patent is extended or adjusted under 35 U.S.C. 154(b) by 0 days.

(21) Appl. No.: 13/760,021

(22) Filed: Feb. 5, 2013

(51) Int. Cl.
*F21L 4/00* (2006.01)

(52) U.S. Cl.
USPC ............................................ 362/183; 362/167

(58) Field of Classification Search
USPC .................. 362/183, 500, 99, 98; 340/85
See application file for complete search history.

(56) References Cited

U.S. PATENT DOCUMENTS

| 8,356,910 B2* | 1/2013 | Messinger et al. ............ 362/183 |
| 2009/0140689 A1* | 6/2009 | Lee ............................... 320/101 |
| 2013/0021162 A1* | 1/2013 | DeBoer et al. ................ 340/635 |
| 2013/0265747 A1* | 10/2013 | Liu ............................... 362/157 |

* cited by examiner

Primary Examiner — Tracie Y Green

(57) ABSTRACT

A charging device for a light includes a light body and a charging assembly which is connected to the light body. The light body has a printed circuit board disposed therein. The charging assembly is electrically connected to the printed circuit board. The charging assembly has a base, an electrical connecting plate and a plurality of wires. The electrical connecting plate is connected to one side of the base. The wires are connected to another side of the base. The electrical connecting plate pivots and bends relative to the base. A plurality of metal conductors is disposed on the electrical connecting plate. Under this arrangement, when the light body needs to be charged, the electrical connecting plate is pulled up and inserted into a port of a computer.

9 Claims, 7 Drawing Sheets

CHARGING DEVICE FOR A LIGHT

BACKGROUND OF THE INVENTION

1. Field of the Invention

The present invention relates to a charging device, and more particularly to a charging device for a light.

2. Description of Related Art

Cycling has become a trend all over the world since it is energy-saving and zero-pollution. In order to ride the bicycle safely, a light device is usually disposed on the bicycle for illumination and warning purposes.

A conventional light device for a bicycle comprises a light body and a plurality of fastening bands. The fastening bands are used to fasten the light body on a bicycle. The light body has a light casing, an emitting device, a fixed assembly and a protecting casing. The light casing is abutted against the fixed assembly. The protecting casing has a receiving segment defined therein. The receiving segment is used to receive the light casing, the emitting device and a fixed assembly. An elastic member is disposed in the light casing. The elastic member has a flange defined thereon and a bottom which abuts against the emitting device. A plurality of buckles is disposed on the protecting casing. The buckles assist the fastening bands to fasten the light body on the bicycle securely.

Although the conventional light body for a bicycle has functions in illumination and warning, the conventional light body for a bicycle cannot be charged when it is run out of power. Besides, when the battery of the light body needs to be changed, a user has to disassemble several components of the light body for replacing the battery. Even more, the discarded battery of the light body is absolutely a severe pollutant to the environment. Therefore, the conventional light body for a bicycle is not only inconvenient for a user but also harmful to the environment.

Thereby, the present invention has arisen to mitigate and/or obviate the disadvantages of the conventional light body for a bicycle.

SUMMARY OF THE INVENTION

The main objective of the present invention is to provide an improved charging device for a light.

To achieve the objective, a charging device for a light comprising a light body and a charging assembly which is connected to the light body, the light body having a printed circuit board disposed therein, the charging assembly electrically connected to the printed circuit board, the charging assembly having a base, an electrical connecting plate and a plurality of wires, the electrical connecting plate connected to one side of the base, the wires connected to another side of the base, the electrical connecting plate pivoting and bending relative to the base, a plurality of metal conductors disposed on the electrical connecting plate, one portion of each metal conductor exposed out of the electrical connecting plate, another portion of each metal conductor disposed into the electrical connecting plate, one end of each wire inserted into another side of the base and connected to one end of another portion of each metal conductor, another end of each wire electrically connected to the printed circuit board. Wherein, the electrical connecting plate has a bending portion and a connecting portion defined thereon, one end of the bending portion is connected to the base, another end of the bending portion is connected to one end of the connecting portion, the bending portion has an inner plate and a casing unit which covers the inner plate defined thereon; one end of the inner plate is connected to the base, a wrinkling segment is defined at one end of the inner plate, the casing unit covers the wrinkling segment; a flexible and thin segment is defined at one end of the inner plate, the casing unit covers the flexible and thin segment; a plurality of guiding grooves is opened on the inner plate and corresponds to the metal conductors and the wires, another end of another portion of each metal conductor is embedded into one end of each corresponding groove, one portion of each metal conductor abuts against the connecting portion, the casing unit covers another end of another portion of each metal conductor; one end of each wire is inserted into another side of the base, one end of each wire is pulled out from one side of the base and inserted into each corresponding guiding groove, one end of each wire is connected to one end of another portion of each metal conductor; a receiving segment is defined at one side of the connecting portion, the metal conductors abut against the receiving segment; a plurality of strips is disposed on one side of the charging assembly, the strips surround three of four sides of the electrical connecting plate, one side which is not surrounded by the strips is at another end of the connecting portion; a storage room is opened on one side of the charging assembly, an indentation is recessed on one side of the storage room and corresponds to the connecting portion of the electrical connecting plate.

Under this arrangement, when the light body needs to be charged, the light body is disassembled from a bicycle by the user firstly; and then, the electrical connecting plate is pulled up and inserted into the port of the computer for charging. Therefore, the electric power is stored in the printed circuit board of the light body, so that the light body is charged and ready to illuminate.

Further benefits and advantages of the present invention will become apparent after a careful reading of the detailed description with appropriate reference to the accompanying drawings.

DETAILED DESCRIPTION OF THE INVENTION

Figure 1:
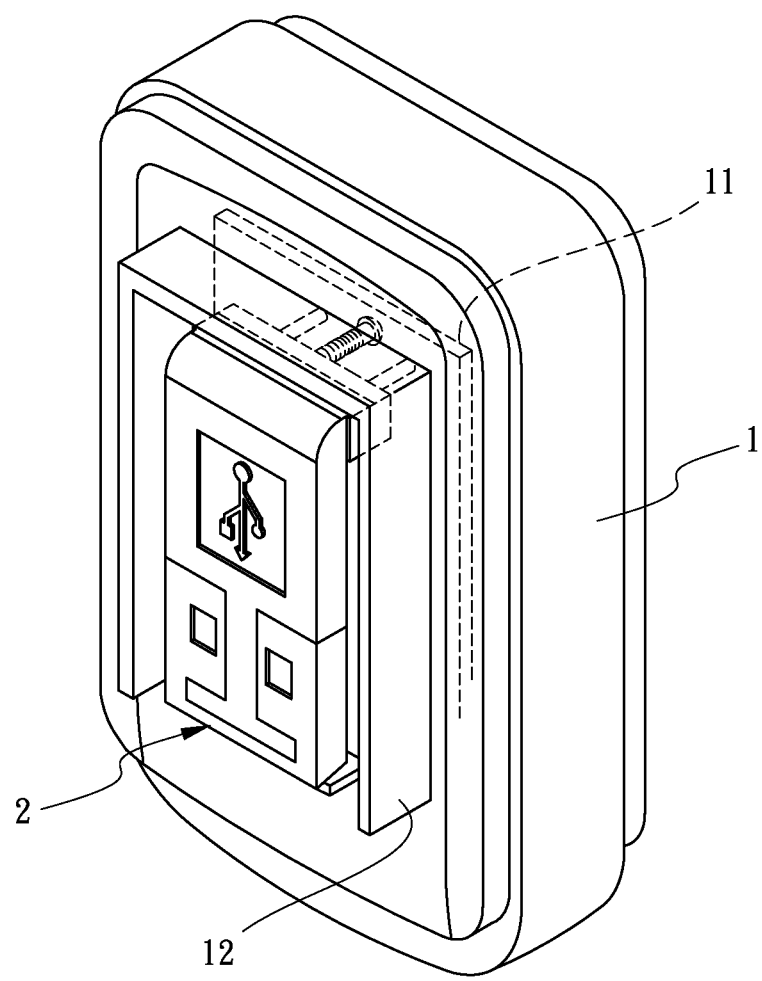
FIG. 1 is a perspective view of a charging device for a light in accordance with the present invention.
Figure 2:
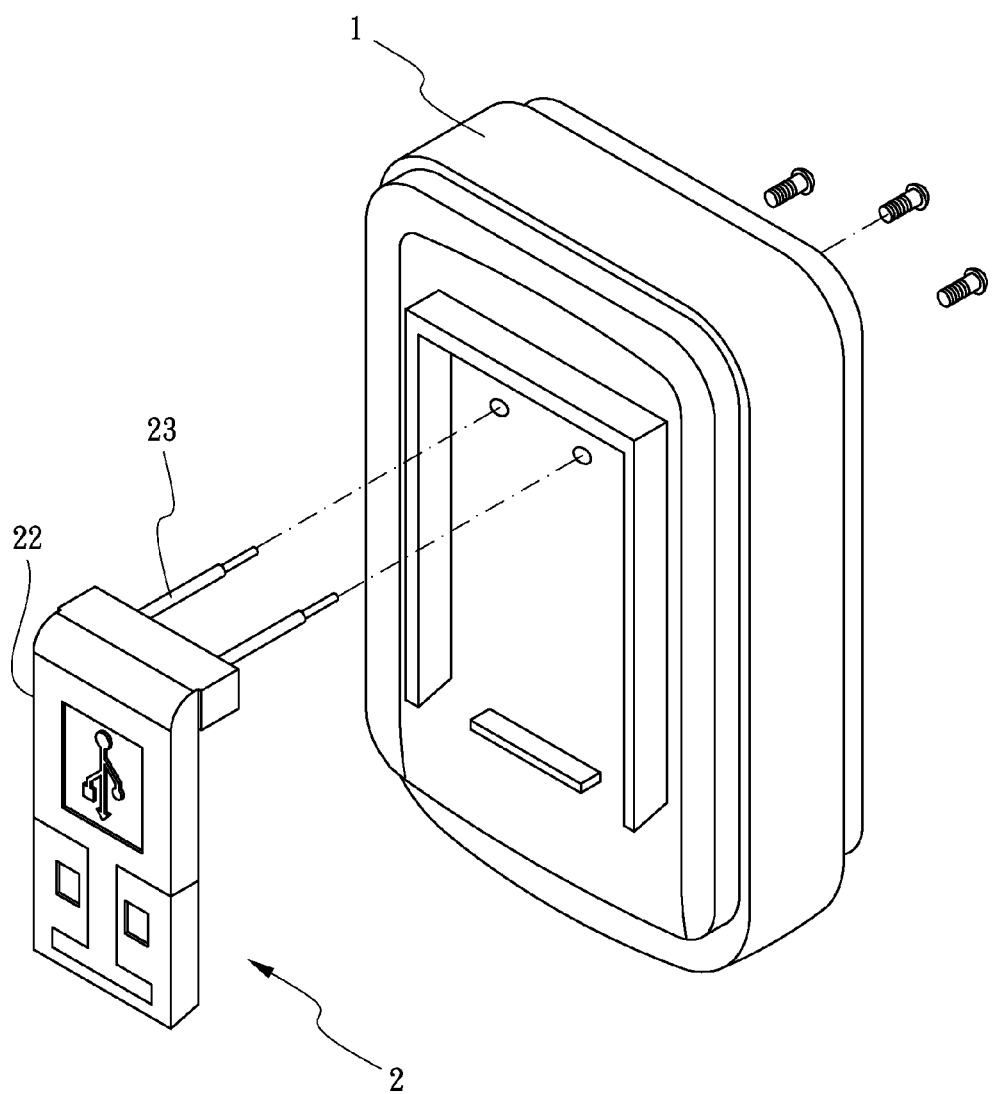
FIG. 2 is an exploded view of the present invention.

Referring to FIGS. 1-6, a charging device for a light comprises a light body 1 and a charging assembly 2 which is connected to the light body 1. The light body 1 is assembled onto a bicycle. A printed circuit board 11 is disposed in the light body 1. The printed circuit board 11 is electrically connected to the charging assembly 2 and capable of storing the electric power. The charging assembly 2 has a base 21, an electrical connecting plate 22 and a plurality of wires 23. The electrical connecting plate 22 is connected to one side of the base 21, and the wires 23 are connected to another side of the base 21. The electrical connecting plate 22 pivots and bends relative to the base 21. The electrical connecting plate 22 is used to connect the present invention to a computer (not shown) for charging the light body 1. A plurality of metal conductors 24 is disposed on the electrical connecting plate 22. One portion of each metal conductor 24 is exposed out of the electrical connecting plate 22, and another portion of each metal conductor 24 is disposed into the electrical connecting plate 22. One end of each wire 23 is inserted into another side of the base 21 and connected to one end of another portion of each metal conductor 24, and another end of each wire 23 is electrically connected to the printed circuit board 11.

Figure 3:
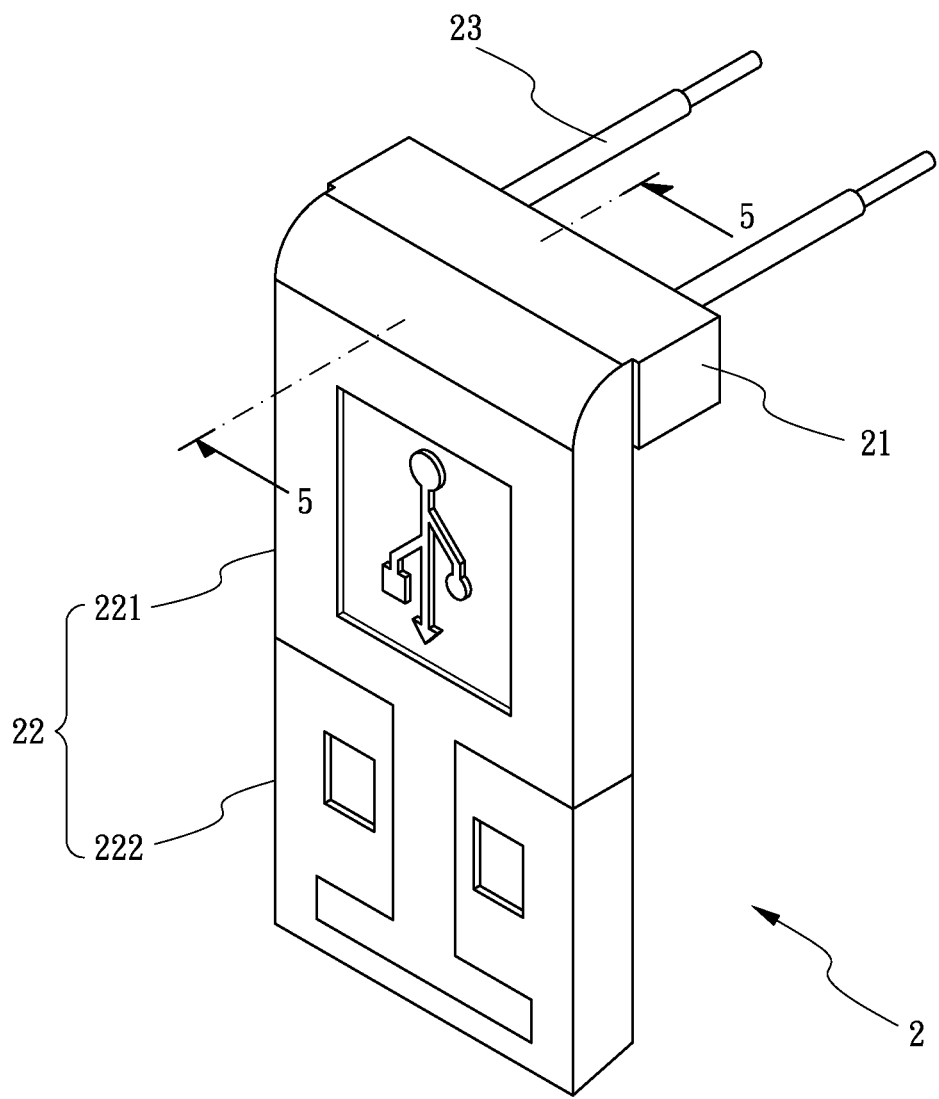
FIG. 3 is a perspective view for showing a charging assembly of the present invention.
Figure 4:
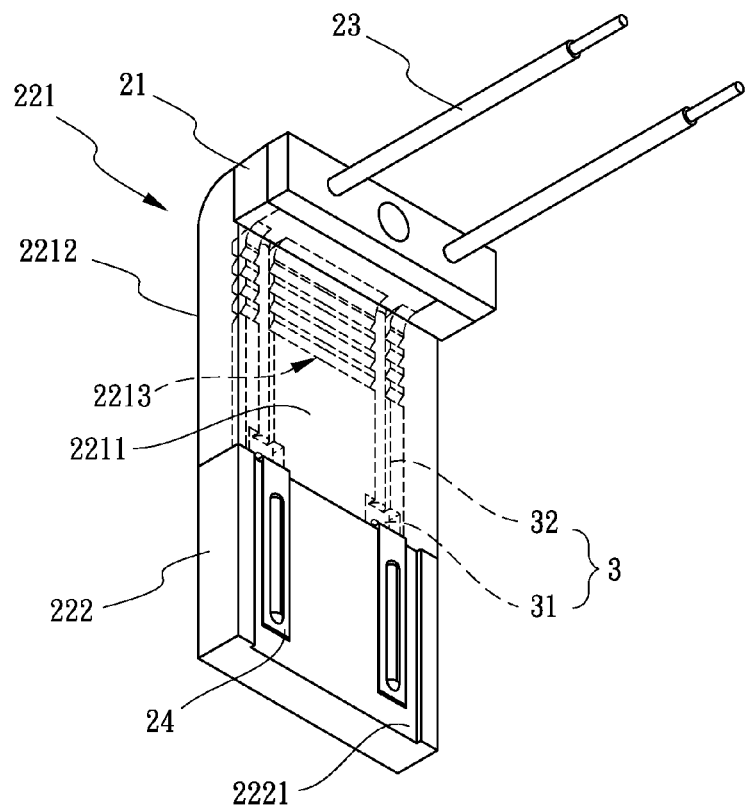
FIG. 4 is another perspective view for showing the charging assembly of the present invention.
Figure 5:
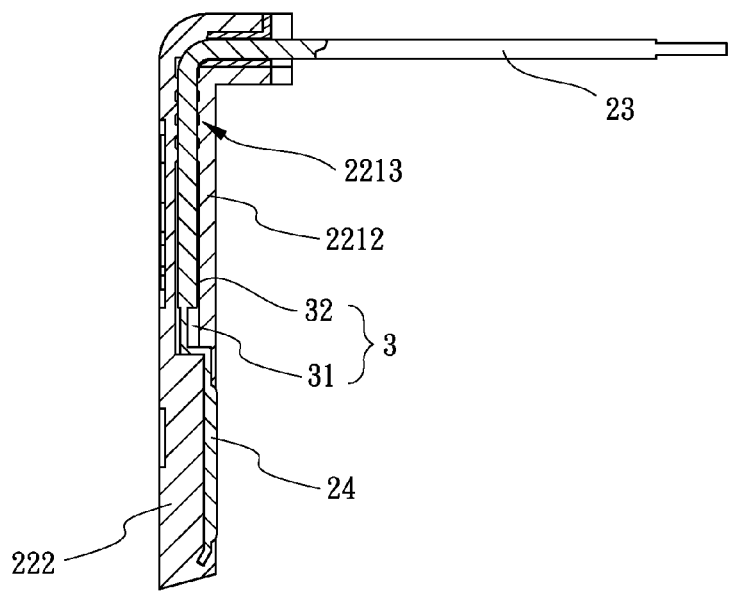
FIG. 5 is a cross-sectional view along line 5-5 shown in FIG. 3.
Figure 6:
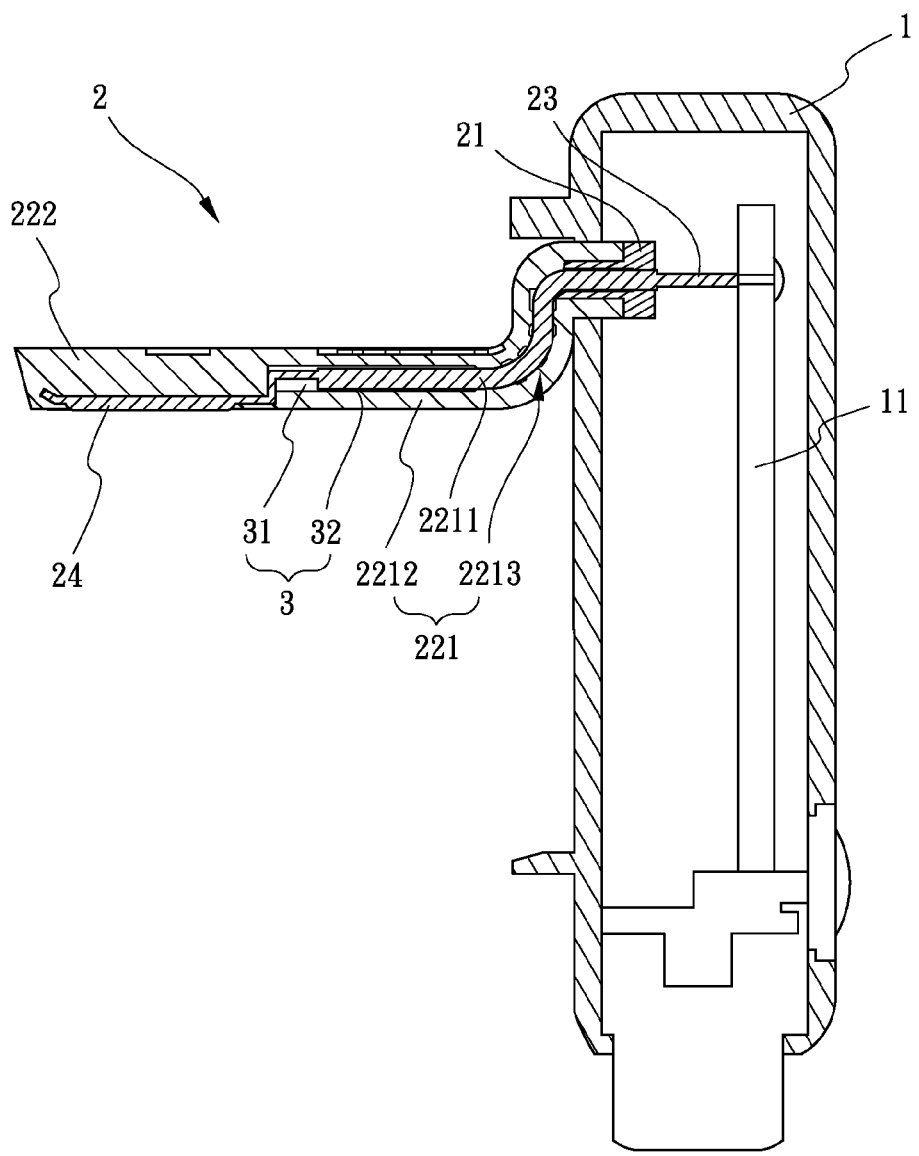
FIG. 6 is a perspective view for showing an electrical connecting plate is pulled up.
Figure 7:
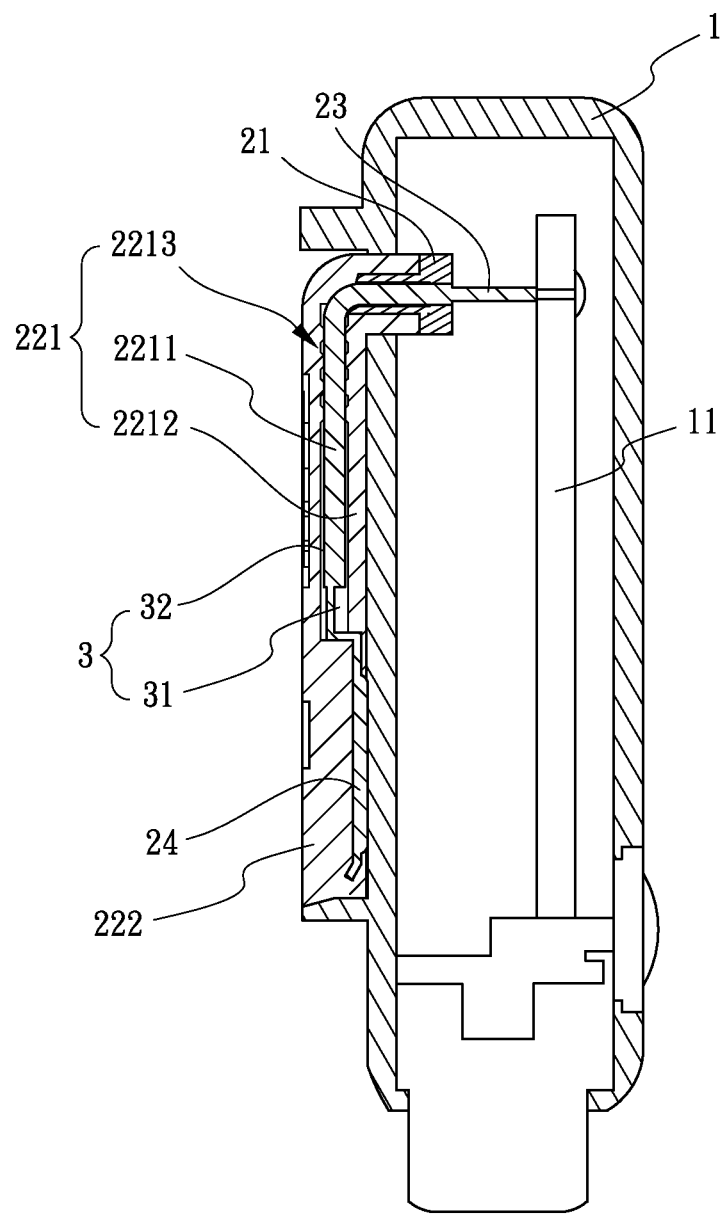
FIG. 7 is a perspective view for showing the electrical connecting plate is stored in an area.
Figure 8:
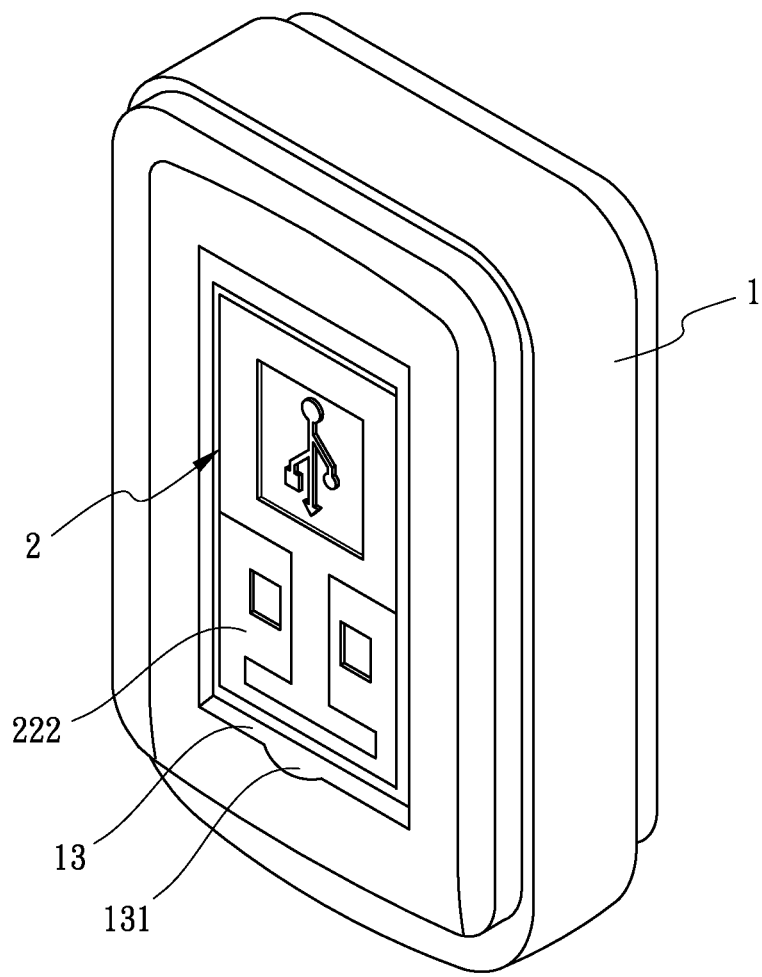
FIG. 8 is a perspective view of another embodiment of the present invention.

Referring to FIGS. 3-5, the characteristics of the electrical connecting plate 22 are described as following. The electrical connecting plate 22 is formed as rectangular shaped. The electrical connecting plate 22 has a bending portion 221 and a connecting portion 222 defined thereon. One end of the bending portion 221 is connected to the base 21, and another end of the bending portion 221 is connected to one end of the connecting portion 222. The bending portion 221 pivots and bends relative to the base 21 in a direction toward the wires 23. The connecting portion 222 moves along with the bending portion 221. The bending portion 221 further has an inner plate 2211 and a casing unit 2212 which covers the inner plate 2211 defined thereon. One end of the inner plate 2211 is connected to the base 21. The inner plate 2211 is flat and rectangular shaped. The inner plate 2211 is thinner than the electrical connecting plate 22. In order to make the electrical connecting plate 22 pivot and bend smoothly relative to the base 21, a wrinkling segment 2213 is defined at one end of the inner plate 2211 in one embodiment, wherein the wrinkling segment 2213 is formed as saw-toothed shaped; while, a flexible and thin segment (not shown) is defined at one end of the inner plate 2211 in another embodiment. The inner plate 2211 bends flexibly and smoothly relative to the base 21 because of the wrinkling segment 2213 or the flexible and thin segment. Therefore, the wrinkling segment 2213 or the flexible and thin segment prevents one end of the inner plate 2211 from breaking up when the inner plate 2211 pivots relative to the base 21.

Referring to FIG. 4, a plurality of guiding grooves 3 is opened on the inner plate 2211 and corresponds to the metal conductors 24 and the wires 23. Each guiding groove 3 is opened from one end of the inner plate 2211 to one end of the connecting portion 222. Each guiding groove 3 has a broad groove portion 31 and a narrow groove portion 32. The broad groove portion 31 is defined at one end of the connecting portion 222. One end of the narrow groove portion 32 is connected to the broad groove portion 31, and another end of the narrow groove portion 32 is opened toward the wrinkling segment 2213 or the flexible and thin segment and ended at one end of the inner plate 2211. Another end of another portion of each metal conductor 24 is embedded into the broad groove portion 31 of each corresponding groove 3. One portion of each metal conductor 24 abuts against the connecting portion 222. The casing unit 2212 covers not only the inner plate 2211 but also another end of another portion of each metal conductor 24 so as to prevent the metal conductors 24 from suffering electric leakage.

Referring to FIGS. 4-5, in order to connect the present invention to the computer smoothly and efficiently, one end of each wire 23 is inserted into another side of the base 21 firstly; and then, one end of each wire 23 is pulled out from one side of the base 21 and inserted into each corresponding guiding groove 3; lastly, one end of each wire 23 is connected to one end of another portion of each metal conductor 24, and one end of each wire 23 is covered by the casing unit 2212.

Therefore, the electrical connecting plate 22 is capable of conducting electricity smoothly and prevents from the electric leakage. In addition, a receiving segment 2221 is defined at one side of the connecting portion 222. The metal conductors 24 are disposed in and abutted against the receiving segment 2221. The connecting portion 222 with the metal conductors 24 disposed thereon is thicker than the inner plate 2211. The receiving segment 2221 prevents the metal conductors 24 from protruding from the connecting portion 222 and allows the metal conductors 24 electrically connecting to the computer in an efficient fashion.

Referring to FIG. 4, in order to store the electrical connecting plate 22 in the light body 1 when the electrical connecting plate 22 is not necessary, the present invention further has a plurality of strips disposed on one side of the charging assembly 2. The strips surround three of four sides of the electrical connecting plate 22. One side which is not surrounded by the strips is at another end of the connecting portion 222. Therefore, when the electrical connecting plate 22 is not necessary, the electrical connecting plate 22 is stored in an area surrounded by the strips; when the electrical connecting plate 22 is necessary, a user pulls up the electrical connecting plate 22 from one side of the area which is not surrounded by the strips 12, so that the electrical connecting plate 22 leaves the area and is ready to be connected to the computer. In another embodiment, the present invention has a storage room 13 opened on one side of the charging assembly 2 for storing the electrical connecting plate 22. The depth of the storage room 13 is at least equal to the thickness of the electrical connecting plate 22. An indentation 131 is recessed on one side of the storage room 13 and corresponds to the connecting portion 222 of the electrical connecting plate 22. Therefore, the electrical connecting plate 22 is stored in the storage room 13 when the electrical connecting plate 22 is not necessary; and the user can pull up the electrical connecting plate 22 easily from the side of the indentation 131.

Referring to FIGS. 2-6, when the user needs to insert the charging assembly 2 into the computer for charging, firstly the electrical connecting plate 22 of the charging assembly 2 is pulled up from the light body 1 so as to make the wrinkling segment 2213 (the flexible and thin segment) of the electrical connecting plate 22 be perpendicular to the base 21 and the rest of the electrical connecting plate 22 be horizontal to the base 21; thereafter, the electrical connecting plate 22 is inserted into a port (not shown) of the computer, the electric power is transmitted from the computer to the printed circuit board 11 of the light body 1 via the metal conductors 24 and wires 23. Therefore, the electric power is stored in the printed circuit board 11 for lighting the light body 1. Referring to FIGS. 1-7, when the charging of the light body 1 is finished, the electrical connecting plate 22 can be pulled out from the port of the computer, and stored in the area surrounded by the strips or in the storage room 13.

Under this arrangement, when the light body 1 needs to be charged, the light body 1 is disassembled from the bicycle by the user firstly; and then, the electrical connecting plate 22 is pulled up and inserted into the port of the computer for charging. Therefore, the electric power is stored in the printed circuit board 11 of the light body 1, so that the light body 1 is charged and ready to illuminate. Besides, since the present invention does not need additional charging device for charging the light body 1, the present invention is light in weight and also environmental friendly.

Although the invention has been explained in relation to its preferred embodiment, it is to be understood that many other possible modifications and variations can be made without departing from the spirit and scope of the invention as hereinafter claimed.

What is claimed is:

1. A charging device for a light comprising a light body and a charging assembly which is connected to the light body;
 the light body having a printed circuit board disposed therein;
 the charging assembly electrically connected to the printed circuit board, the charging assembly having a base, an electrical connecting plate and a plurality of wires, the electrical connecting plate connected to one side of the base, the wires connected to another side of the base, the electrical connecting plate pivoting and bending relative to the base, a plurality of metal conductors disposed on the electrical connecting plate, one portion of each metal conductor exposed out of the electrical connecting plate, another portion of each metal conductor disposed into the electrical connecting plate; and
 one end of each wire inserted into another side of the base and connected to one end of another portion of each metal conductor, another end of each wire electrically connected to the printed circuit board.

2. The charging device for a light as claimed in claim 1, wherein the electrical connecting plate has a bending portion and a connecting portion defined thereon; one end of the bending portion is connected to the base; another end of the bending portion is connected to one end of the connecting portion; the bending portion has an inner plate and a casing unit which covers the inner plate defined thereon.

3. The charging device for a light as claimed in claim 2, wherein one end of the inner plate is connected to the base; a wrinkling segment is defined at one end of the inner plate; the casing unit covers the wrinkling segment.

4. The charging device for a light as claimed in claim 2, wherein a flexible and thin segment is defined at one end of the inner plate; the casing unit covers the flexible and thin segment.

5. The charging device for a light as claimed in claim 2, wherein a plurality of guiding grooves is opened on the inner plate and corresponds to the metal conductors and the wires; another end of another portion of each metal conductor is embedded into one end of each corresponding groove; one portion of each metal conductor abuts against the connecting portion; the casing unit covers another end of another portion of each metal conductor.

6. The charging device for a light as claimed in claim 5, wherein one end of each wire is inserted into another side of the base; one end of each wire is pulled out from one side of the base and inserted into each corresponding guiding groove; one end of each wire is connected to one end of another portion of each metal conductor.

7. The charging device for a light as claimed in claim 2, wherein a receiving segment is defined at one side of the connecting portion; the metal conductors abut against the receiving segment.

8. The charging device for a light as claimed in claim 1, wherein a plurality of strips is disposed on one side of the charging assembly; the strips surround three of four sides of the electrical connecting plate; one side which is not surrounded by the strips is at another end of the connecting portion.

9. The charging device for a light as claimed in claim 1, wherein a storage room is opened on one side of the charging assembly; an indentation is recessed on one side of the storage room and corresponds to the connecting portion of the electrical connecting plate.

* * * * *